United States Patent [19]

Wallace

[11] Patent Number: 5,651,576
[45] Date of Patent: Jul. 29, 1997

[54] SLEWING MACHINE

[75] Inventor: Robert James Wallace, Yackandandah, Australia

[73] Assignee: R. J. Wallace Pty. Limited, Victoria

[21] Appl. No.: 719,592

[22] Filed: Sep. 25, 1996

Related U.S. Application Data

[63] Continuation of Ser. No. 302,712, Sep. 9, 1994, abandoned.

[30] Foreign Application Priority Data

Mar. 10, 1992 [AU] Australia ................................. PL1245

[51] Int. Cl.[6] ...................................................... B60N 2/14
[52] U.S. Cl. ..................... 296/65.1; 248/425; 297/344.22; 74/96
[58] Field of Search ...................... 296/63, 64, 65, 296/68; 248/282.1, 186.1, 186.2, 425, 349; 297/344.11, 344.21, 344.22, 344.23; 74/96

[56] References Cited

U.S. PATENT DOCUMENTS

| 975,069 | 11/1910 | Richardson et al. ............. 248/282 |
| 975,070 | 11/1910 | Richardson et al. ............. 248/282 |
| 1,054,241 | 2/1913 | Richardson et al. ............. 248/282 |
| 1,054,242 | 2/1913 | Richardson et al. ............. 248/282 |
| 2,822,858 | 2/1958 | Mussler . | |
| 3,186,761 | 6/1965 | Propst ............................. 248/425 X |
| 3,542,424 | 11/1970 | Bingley ......................... 296/65.1 X |
| 3,727,873 | 4/1973 | Hill ............................. 297/344.22 X |
| 4,687,167 | 8/1987 | Skalka et al. ................. 248/425 X |
| 4,733,903 | 3/1988 | Bailey ........................... 296/65.1 |
| 4,759,522 | 7/1988 | Brown ........................... 248/425 X |

FOREIGN PATENT DOCUMENTS

| 1562228 | 9/1929 | Australia . | |
| 1266227 | 4/1968 | Germany . | |
| 2151969 | 4/1973 | Germany ......................... 296/68 |
| 1242950 | 8/1971 | United Kingdom . | |
| 2236476 | 4/1991 | United Kingdom ............ 296/65.1 |

Primary Examiner—Dennis H. Pedder
Attorney, Agent, or Firm—Edwin D. Schindler

[57] ABSTRACT

A slewing mechanism which is particularly suitable for use with a car seat for the physically disabled which permits a combined translational and rotational movement of a plate (6) or the like to which, say, a seat assembly (100) may be connected and which includes a primary arm (1) rotatable about a pivot (2) adjacent one end, a secondary arm (4) pivotally connected to the primary arm (1) by a pivot (5) adjacent the other end, the secondary arm (4) being pivotally connected to the plate (6) and a first link (8) to link the secondary arm (4) to the surface to which the primary arm (1) is pivoted and a second link (9) which connects the upper plate (6) to the primary arm (1).

4 Claims, 6 Drawing Sheets

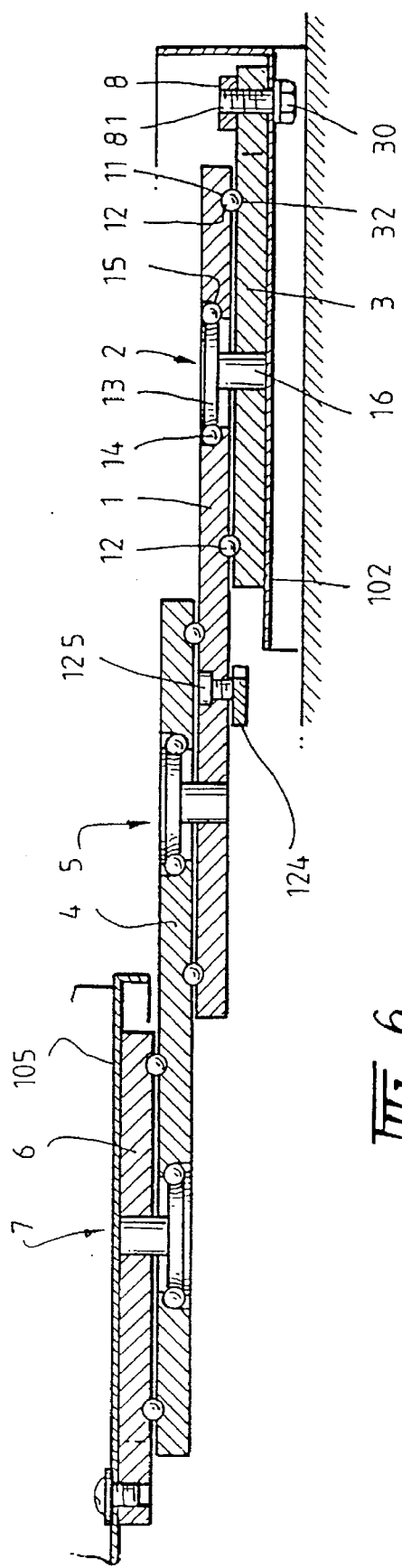

SLEWING MACHINE

This is a continuation of application Ser. No. 08/302,712, filed Sep. 9, 1994, now abandoned.

This invention relates to a slewing mechanism and in particular to a mechanism which can effect slewing of a motor vehicle seat so that it effectively moves forward whilst it rotates so that a passenger in the seat can be moved from a position in which the seat is normally located to a position where the seat presents at or beyond the door sill whilst, at the same time, avoiding fouling of a door, door pillar or the like.

Whilst we will exemplify the invention by reference to a car seat it is to be understood that the same mechanism is equally applicable to other applications such as in furniture, appliances, agricultural machinery and earth moving machinery. The invention could also be applied to mechanisms in ambulances and for access by the physically disabled to baths or the like and these and other applications are incorporated in the invention.

There have previously been proposed mechanisms to enable a person in a vehicle, whether the driver or passenger, to obtain ingress and egress notwithstanding the fact that the person concerned has physical disabilities.

In the end result in these previous devices the seat is moveable from a position where it is conventionally located to a position where at least the leading edge of the seat extends beyond the door sill of the vehicle.

The previously proposed mechanisms are basically relatively cumbersome and awkward to use and normally necessitate the movement on slides, in two directions. These constructions tend, to be fragile as they often leave the seat cantilevered on the slides. They can also be very complex and expensive.

It is the object of the present invention to provide a slewing mechanism which operates effectively to provide both a translation and a rotating movement which mechanism is rugged in construction but nevertheless economic to produce, and, in particular, to provide such a mechanism for use with a vehicle seat or the like.

The invention in its broadest concept comprises a slewing mechanism having a primary arm rotatable about a pivot adjacent one end, a secondary arm pivotally connected to the primary arm at a pivot adjacent the other end of the primary arm and an upper plate which rotates about a pivot connected to the secondary arm at a position spaced from its first pivot and means to link the secondary arm to the surface to which the primary arm is pivoted and a second link which connects the upper plate to the primary arm whereby on rotational movement of the primary arm, the upper plate is caused to translate and to rotate.

In one preferred form of the invention the translation follows a circular path of constant radius and the rotation over the required movement is effectively 90 degrees.

The range of translation and the degree of rotation can be varied within certain limits.

The invention also includes a vehicle seat comprising the slewing mechanism of the invention, the seat being moveable between a first position at which it is in the normal position of a seat in a vehicle to a second position where at least its leading edge extends beyond the vehicle door with the seat effectively being directed outwardly relative to the door.

In order that the invention may be more readily understood we shall describe, in relation to the accompanying drawings, one particular embodiment of the invention together with certain modifications that can be made to this embodiment.

In these drawings:

FIG. 6 is a sectional view along line 6 6 of FIG. 5.

Figure 1:
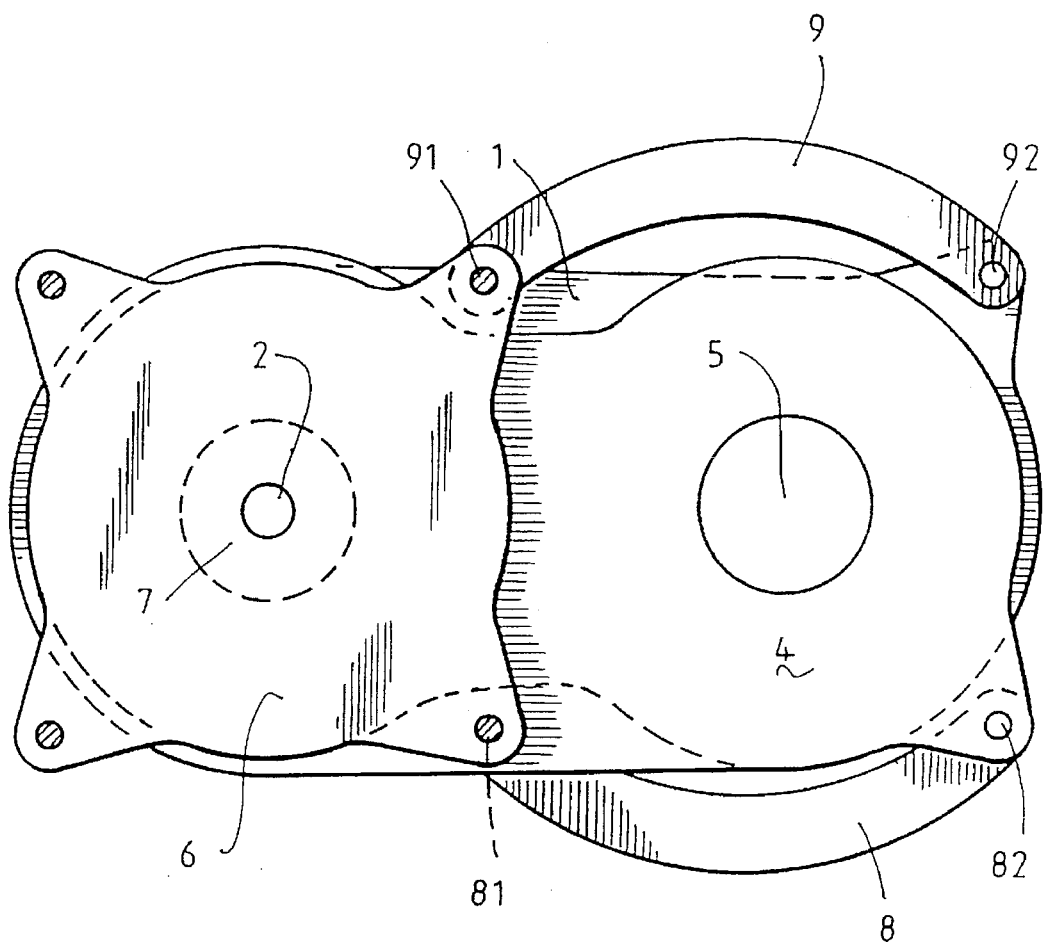
FIG. 1 is a plan view of the mechanism as it will be described in relation to the passengers seat of a vehicle when the seat is in its normal use position.
Figure 2:
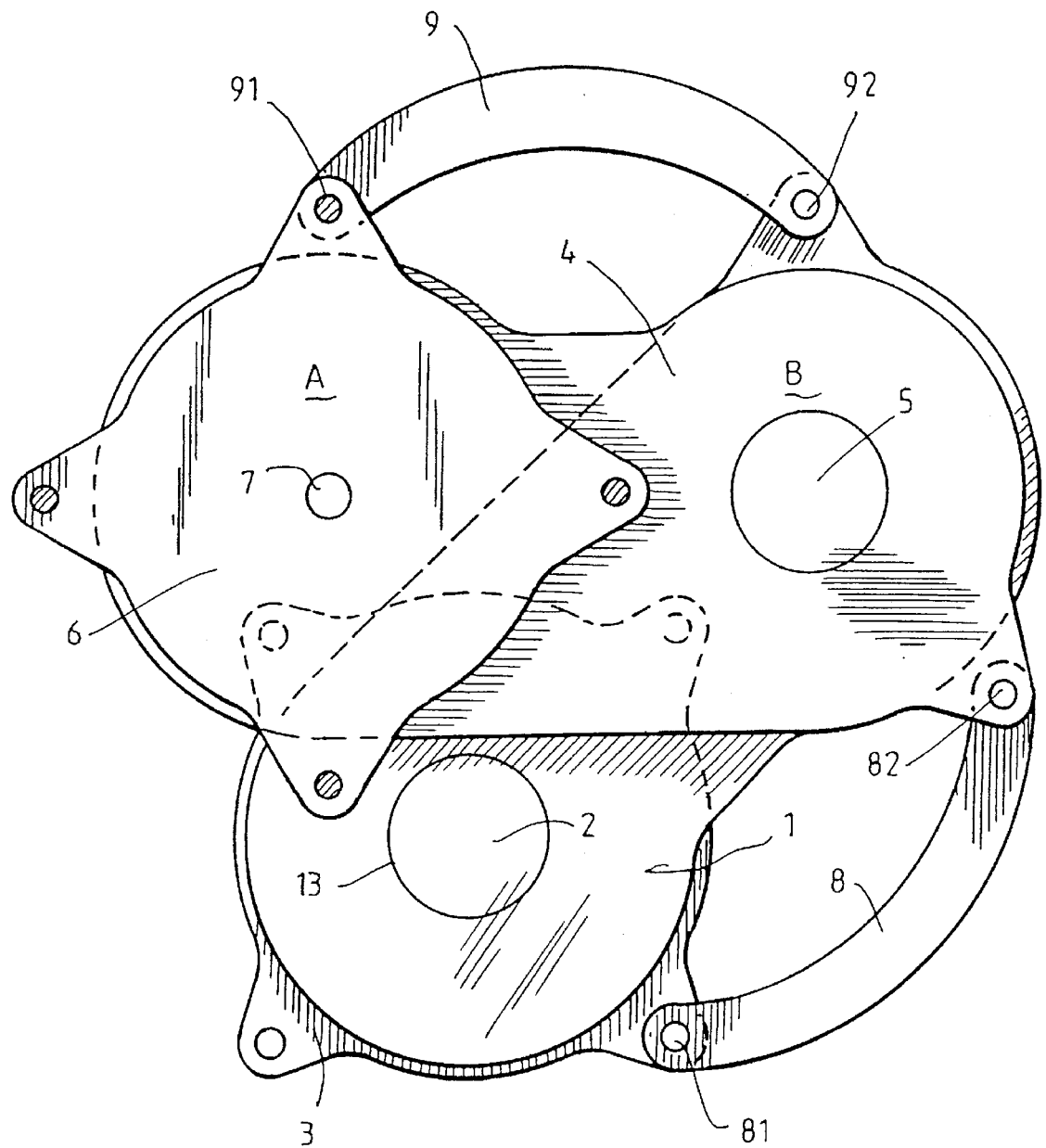
FIG. 2 is a view of the mechanism of FIG. 1 partially moved.
Figure 3:
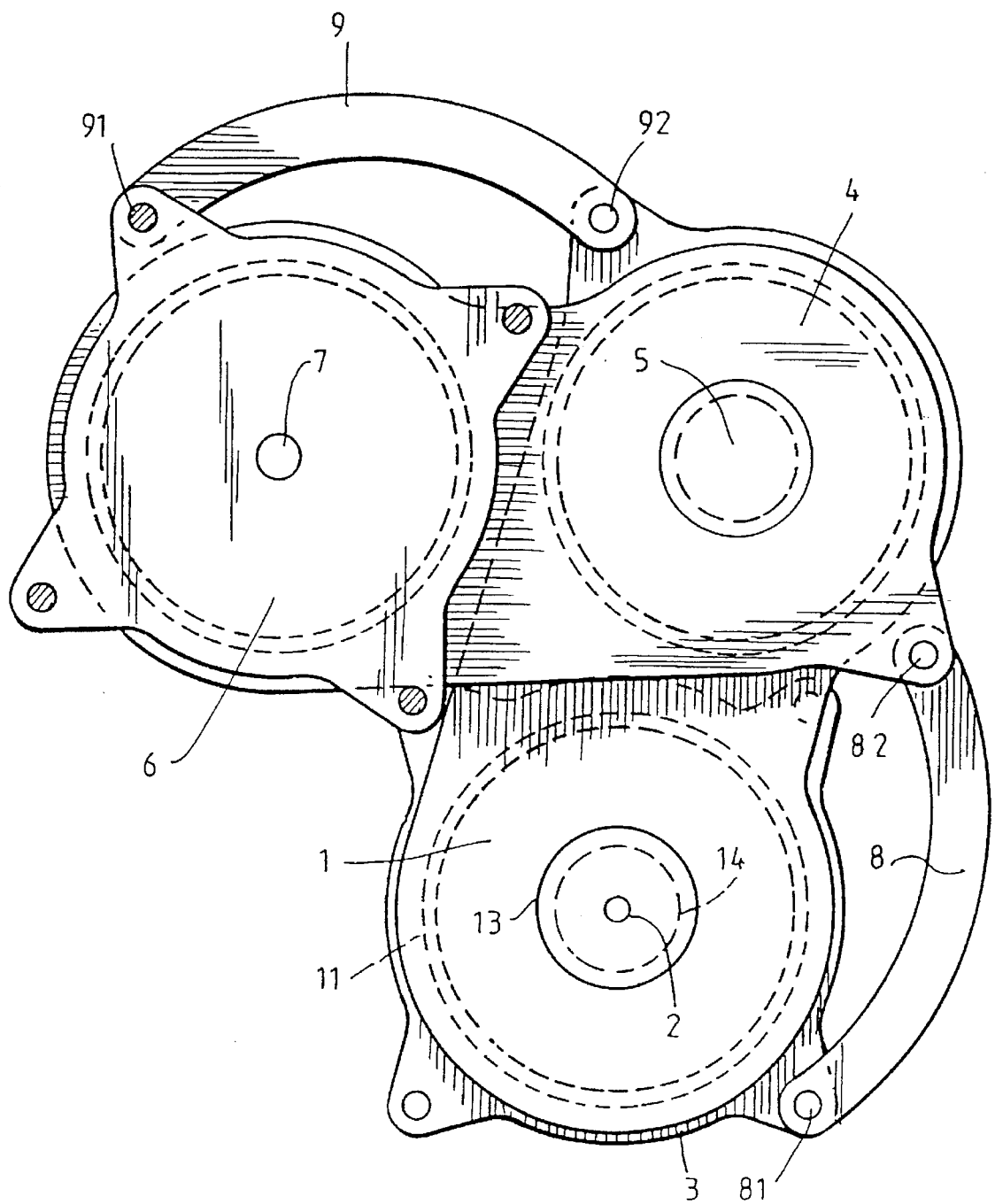
FIG. 3 is a view of the mechanism of FIG. 1 in its fully moved position.

The mechanism has a bottom plate 3 which, in the preferred embodiment may be adapted to be connected by way of a sub frame 102 to the floor of a vehicle and can be of a form to provide the required height. The sub frame 102 may be connected by bolting or otherwise connected to the vehicle body.

By using the sub frame 102, the mechanism can be used with a wide range of vehicles.

As illustrated the plate 3 may be a square or rectangular plate.

Mounted on a pivot 2 connected to plate 3 there is a primary arm 1 and this may be made of any required material and be of any shape.

As illustrated it is somewhat of a dumbbell shape and this may be preferred if, say, a bearing race is to be connected between the plate 3 and the arm 1.

As illustrated the plate 3 has an arcuate groove 32 and the arm 1 a corresponding groove 11 and ball bearings 12 are located between the two grooves to support the arm relative to the plate and to permit rotation thereof.

We also provide a recess 15 in the upper portion of the arm 1 and in this recess there are provided ball bearings for a ball race 14 which co-operations with a bearing member 13 which extends upwardly on a shaft 16 from bottom plate 3.

It will be seen that with an arrangement such as this, the arm 1 can rotate readily relative to plate 3 notwithstanding that there are substantial cantilever loads between the contacting faces of the plate 3 and the arm 1.

A secondary arm 4 is pivotally connected by means of a pivot 5 which may be attached to arm 1 at a distance from pivot 2 thereof.

An upper plate 6 is pivotally connected by means of pivot 7 to the secondary arm 4 with the pivots 5 and 7 being spaced by required distances.

The interconnection of the secondary arm 4 with the arm 1 and that of the upper plate 6 with the secondary arm 4, are, as illustrated, similar to the manner of connection of the bottom plate 3 with the arm 1. That is there are annular grooves in the inner faces of the adjoining members which receive ball bearings to permit ready rotation whilst loaded and the pivots 5 and 7 also include ball bearings or ball races to absorb cantilever loads on the members relative to the member therebelow.

In fact the connection of the secondary arm 4 and the upper plate 6 is effected in a direction opposite the two earlier connections but the load can be borne in either orientation.

Whilst we have described one particular form of bearing arrangements between the adjacent rotating components it is to be understood that these can be varied as required.

A primary link 8 is pivotally connected both to the bottom plate 3, by pivot 81 and the secondary arm 4, at pivot 82 and the upper plate 6 is pivotally connected to the primary arm 1 by means of secondary link 9, the connection to upper plate 6 being at pivot 91 and the primary arm 1 at pivot 92.

The arrangement of the arms and their links are such that when the primary arm 1 is rotated relative to the bottom plate 3 then the secondary arm 4 is caused to rotate about pivot 5, because of the location of primary link 8, and the pivot point 7 will commence to translate relative to the bottom plate 3.

At the same time that this translation is effected the upper plate 6 will also be rotated as secondary link 9 constrains the outward movement of the upper plate 6.

The particular arrangement, as illustrated, is effectively symmetrical and the translation of pivot 7 will follow a circular path of constant radius and the rotation of the upper plate 6 can be such that during the movement of the lower plate 1 the upper plate rotates through approximately 90 degrees.

This arrangement is satisfactory for causing a seat assembly 100, which is connected to upper plate 6, to move forwardly and outwardly from its initial position to a position in a car door and, at the same time the seat is caused to rotate through approximately 90 degrees so that a passenger in the seat will move from a first, normal, position directed towards the direction of movement of the vehicle to a second position substantially at right angles thereto.

The movement is such that during the initial part of the movement the seat will move forwardly past the door pillar 101 and then rotate outwardly so that at least part of the seat extends through the door opening.

On the reverse movement the seat will move inwardly and then rearwardly effectively around the pillar 101 until it assumes its initial condition.

Figure 4:
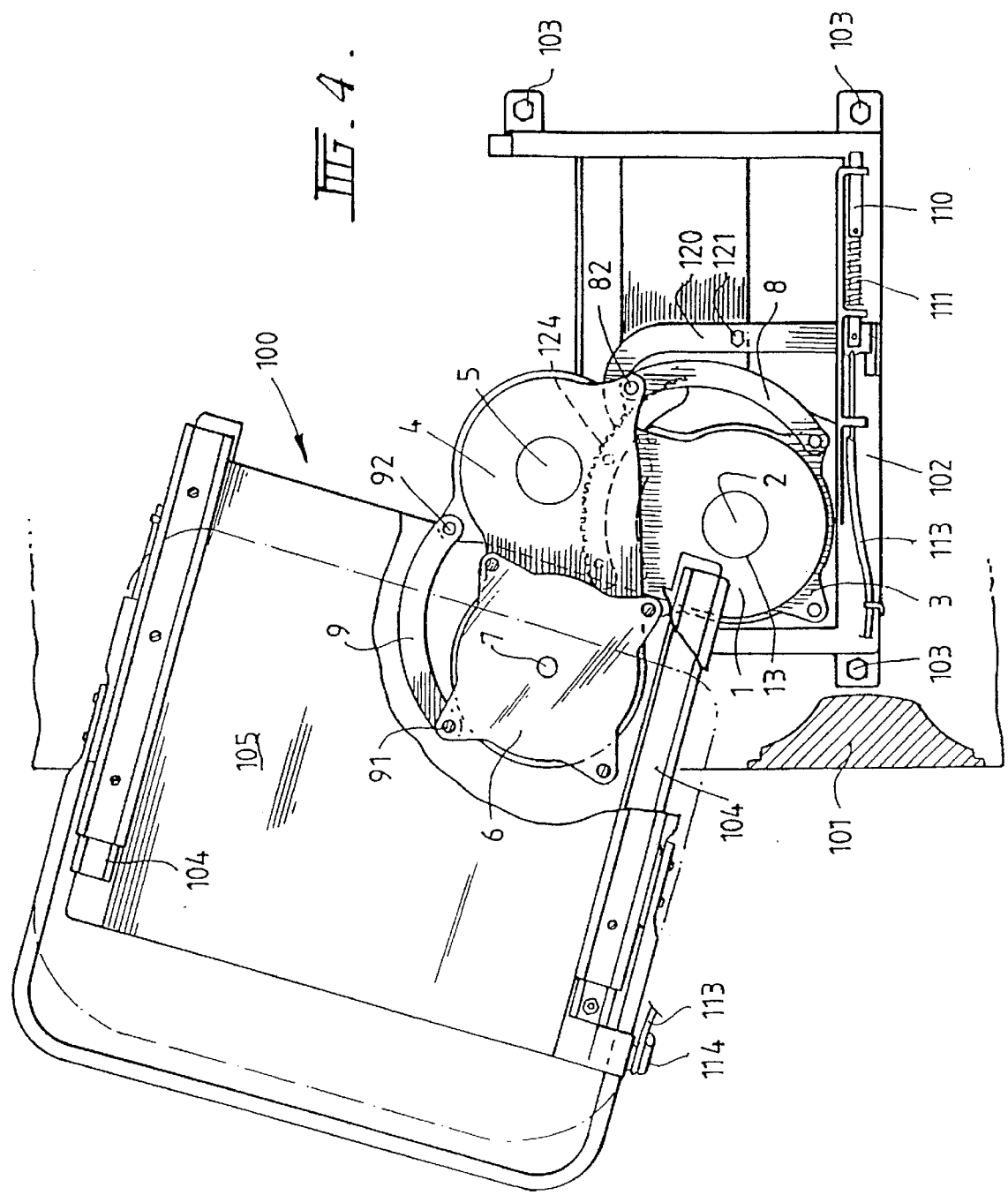
FIG. 4 is a view of the mechanism associated with a car seat and is in effectively the position shown in FIG. 3 but showing the location of the seat assembly, the location of the mechanism on a vehicle floor and locking means.
Figure 5:
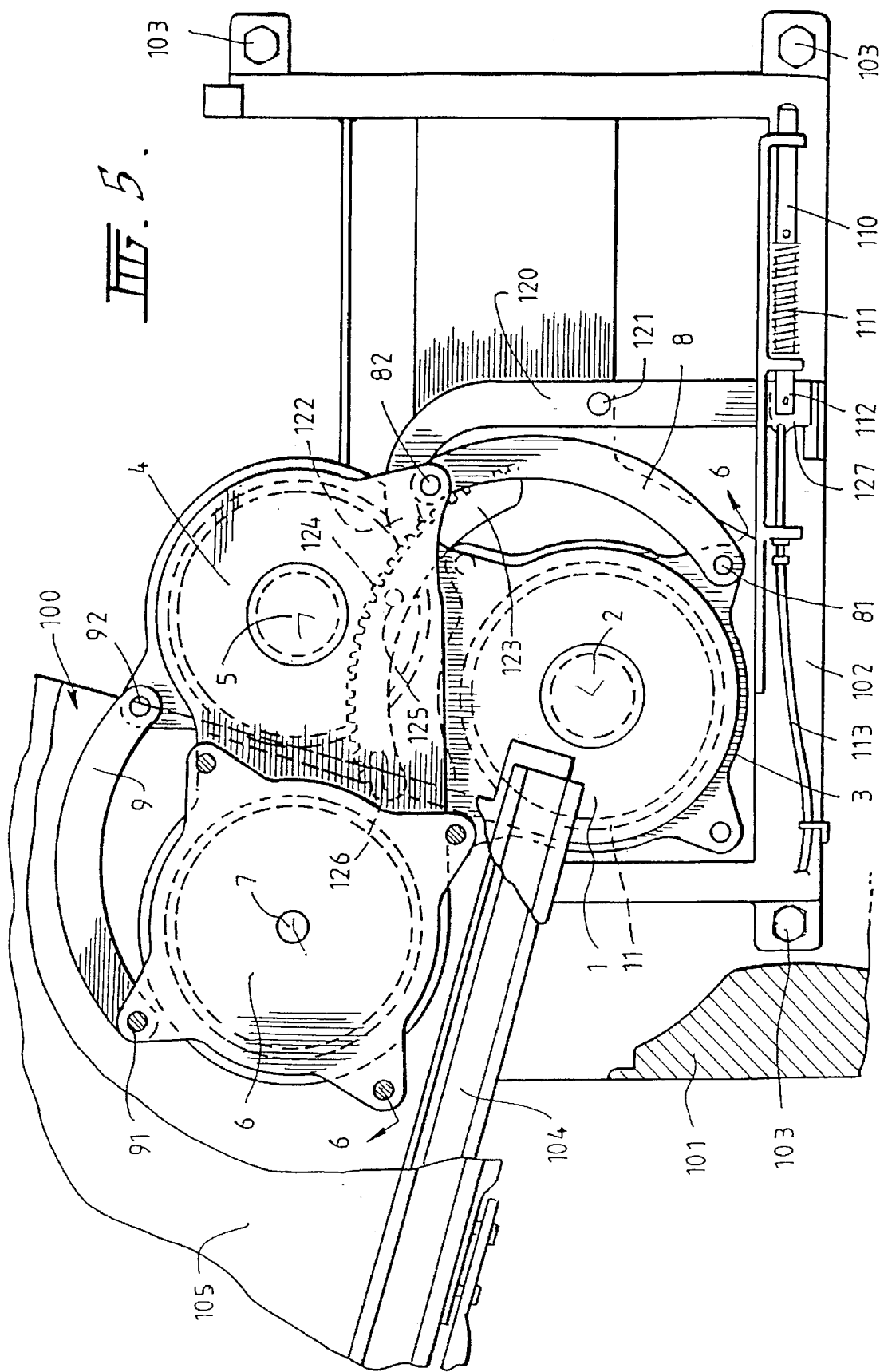
FIG. 5 is an enlarged view of part of FIG. 4.

FIGS. 4 and 5 show an arrangement in which the mechanism is associated with a car seat and this will be described further hereinafter.

It will be appreciated that such a seat is most desirable for persons with disabilities who can, say, be removed from a wheel chair and placed on the seat when it is in the second position described and then the seat can be caused to move to a normal driving or passengers position.

Depending upon the particular configuration and movement required the lengths of the various components and linkages and the location of the pivots, can be changed to give a combined movement which differs substantially from that illustrated above. The movement may be elliptical rather than circular and the translation and rotation components of the movement can vary widely. Such movements may be required for particular applications. For example if the door pillar is located forwardly of the seat, it may be necessary for the seat to move forward substantially before it starts to move on the arc of a circle and before the rotation is effected.

Movement of the mechanism can, it will be appreciated, be effected by movement of any of the components but normally would be effected either by positive movement of the primary arm 1 or movement of the upper plate 6. For example when the mechanism is applied to a vehicle seat the movement may be achieved by physically moving the seat and its occupant after some form of latching mechanism is released.

FIGS. 4 and 5, which show the car seat assembly 100 associated with the mechanism also shows a driven form of mechanism and a form of locking mechanism.

In this form the plate 3 is connected to one side of a sub-frame 102 which, in turn, can be connected by bolts or the like 103 to the floor pan of the vehicle, the frame 102 affectively occupying the same position as the conventional seat rail assembly.

The seat rails 104 are then connected to the upper plate 6, by means of any required sub assembly 105 which may be necessary to permit the required connection and the seat 105 is mounted on the rails in a conventional manner so as to be adjustable there along. By providing different sub-assemblies 105 so different forms of seat can be connected to the same mechanism.

The mechanism can be sufficiently thin that, notwithstanding the mechanism and the sub-assemblies 102 and 105, the normal vehicle seat can be used and can be at its normal height.

In order to lock the assembly we provide a locking pin 110 which is biased by a spring 111 to normally extend outwardly, as shown in FIGS. 4 and 5 and to the inner end 112 of the pin there can be connected a flexible cable or the like 113. This cable may terminate on the side of the seat in a position which is exposed when the seat is in its normal, driving, position and a handle or the like 114 can be provided to cause movement of the cable 113 and thus of the pin 110.

On the seat assembly 100 there can be an aperture or the like through which the pin can pass so that when the seat assumes its normal position then it is prevented from further movement until the pin 110 is released. When the seat reaches this position we can provide additional inter-engaging lugs, normally two such lugs which provide force transfer if the vehicle is in an accident situation.

The pin 110 may have a tapered outer end or the seat frame may have a ramp so that the locking movement is automatic when the seat reaching its normal position.

Associated with the locking pin there is a second locking member 120 which is connected at one end 127 to the end 112 of the pin which member is itself adapted to be rotatable about a pivot 121. The free end of this member, which is inturned, is formed to mesh with teeth 124 on an arcuate member 123 which is connected to the primary arm 1. The connection is shown as being by nuts or studs 125, 126.

The arcuate member is arcuate about the axis of the pivot 2 of the member 1.

The arrangement is such that when the seat is in its normal position and the handle 114 is operated the pin 110 is drawn inwardly against the spring 111 and the lower end of the member 120 is caused to rotate in a clockwise manner, looking from the direction of FIG. 5 about its pivot 121 and this causes the formed end 122 to disengage from the ratchet teeth 124 on the arcuate member 125.

If at any stage during rotation it is required to lock the seat it is only necessary to release the handle 114 and, under influence of the spring 111 the member 120 will rotate about pivot 121 and its end 122 will engage the teeth 124 on the member 123 and the seat is locked. Further manipulation of the handle will again free the seat.

That is to say in order to effect rotation of the seat the handle 114 has to be operated to free the mechanism.

It is also possible to motor drive the mechanism, although this is not shown but preferably a motor would be used to cause rotation of primary arm 1. This is most convenient as the arm 1 is connected by the pivot 2 to the vehicle body so the only movement of the arm is rotational movement about the pivot.

The form of operation and the form of motor used will not be further described except to say that the motor may be electric, hydraulic or pneumatic.

The periphery of the arm 1 at the pivot 2 may be formed as a worm wheel or may have gear teeth therein and the motor may be provided with a worm or spur gear to effect driving.

Alternatively a linear actuator or screw could be used to effect the movement.

In such an arrangement whilst the motor is operating the seat will move but, generally, when the motor stops the seat will be locked in the position then reached. With a motor drive arrangement we may still leave the arcuate member 123 and the member 120 in operation or these could be disregarded.

If required, in the motorised version, the switch for the drive motor may be actuated when the handle 114 is moved to release the pin 110 so that the seat will automatically be moved to its second position when the pin is released and so long as the switch was closed.

The handle 114 could then be associated with a further switch which would be operated on reverse movement thereof to cause the motor to drive in a reverse manner to move the seat back to its normal position.

If a motor driven version is provided then we prefer to provide limit switches at the two ends of its movement so that the motor is de-energised when the seat has reached the limit of its movement in a particular direction.

In other applications we may prefer to provide mechanical stops which prevent extreme movement of the seat.

Whilst we have described the seat as being in the passenger's position it will be appreciated that a mirror image of the mechanism will work equally satisfactorily for a driver so that a disabled driver may use the seat incorporating the mechanism of the invention equally as satisfactorily as a passenger. Also, and as mentioned earlier herein whilst we have described the mechanism specifically for use in a car seat to enable disabled persons to readily enter and leave a motor vehicle a similar mechanism could be used in other applications where a mixture of translation and rotation is required.

For example in some heavy agricultural and civil engineering equipment the space for a driver is very limited and it could be desirable to use a mechanism of the type described herein in association with a seat in a vehicle of that type to facilitate ingress and egress of the driver.

We claim:

1. A slewing machine, comprising:
   a first pivot on a support surface;
   a first plate having a first end and a second end, said first plate being rotatable adjacent said first end about said first pivot an axis of said first pivot being substantially orthogonal to a face of said plate;
   a second pivot adjacent said second end of said first plate;
   a second plate having a first end and a second end, said first end of said second plate being pivotally connected to the second end of said first plate at the second pivot;
   a third pivot adjacent said second end of said second plate;
   an upper plate rotatably connected to said second plate about said third pivot;
   a first link pivotally connected between the support surface and said first end of said second plate; and,
   a second link pivotally connected between said second end of said first plate and said upper plate, whereby, upon movement of said slewing machine, said third pivot is constrained to effect an arcuate movement, while said upper plate rotates about said third pivot.

2. The slewing machine according to claim 1, further comprising means for locking said slewing machine at discrete positions.

3. A vehicle seat, comprising: a slewing machine including,
   a first pivot on a support surface;
   a first plate having a first end and a second end, said first plate being rotatable adjacent said first end about said first pivot an axis of said first pivot being substantially orthogonal to a face of said plate;
   a second pivot adjacent said second end of said first plate;
   a second plate having a first end and a second end, said first end of said second plate being pivotally connected to the second end of said first plate at the second pivot;
   a third pivot adjacent said second end of said second plate;
   an upper plate rotatably connected to said second plate about said third pivot;
   a first link pivotally connected between the support surface and said first end of said second plate; and,
   a second link pivotally connected between said second end of said first plate and said upper plate, whereby, upon movement of said slewing machine, said third pivot is constrained to effect an arcuate movement, while said upper plate rotates about said third pivot;
   a seat located in a vehicle; and,
   means for moving said seat between a first position, at which it is in a normal position for said seat in the vehicle, and a second position wherein a leading edge of said seat is located within the vehicle doorway, so that said seat is directed outwardly relative to the vehicle doorway.

4. The vehicle seat according to claim 3, further comprising means for locking and retaining said seat in the normal position.

* * * * *